United States Patent
Katzman

(10) Patent No.: US 6,717,755 B1
(45) Date of Patent: Apr. 6, 2004

(54) MULTIPLE RAMPED ATHERMAL COMPENSATION APPARATUS

(75) Inventor: Steven A. Katzman, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/255,651

(22) Filed: Sep. 25, 2002

(51) Int. Cl.[7] .................................................. G02B 7/02
(52) U.S. Cl. ...................................................... 359/820
(58) Field of Search ................................. 359/820, 819, 359/703, 704

(56) References Cited

U.S. PATENT DOCUMENTS

| | | | |
|---|---|---|---|
| 5,557,474 A | 9/1996 | McCrary | 359/820 |
| 6,108,145 A | * 8/2000 | McCrary | 359/820 |
| 6,545,826 B2 | * 4/2003 | Horwitz et al. | 359/820 |

* cited by examiner

Primary Examiner—Ricky Mack
(74) Attorney, Agent, or Firm—Rod D. Baker

(57) ABSTRACT

An apparatus for passively compensating for undesirable positional shifts in objects due to temperature changes. The apparatus is particularly suited for use in optical assemblies, where it is desired to compensate for thermal changes in the system to maintain an optical focus despite large changes in environmental temperature. A specially configured compensating member is placed between two objects whose spacing is to be regulated. The compensating member is composed of a material having a non-linear coefficient of thermal expansion, to permit the use of a compensating member also having a very high average coefficient of thermal expansion. The compensating member has multiple ramps or faces positioned at differing angles to permit thermal compensation to be predetermined and provided for selected temperatures, despite the non-linearity of the compensating member's coefficient of thermal expansion.

15 Claims, 4 Drawing Sheets

MULTIPLE RAMPED ATHERMAL COMPENSATION APPARATUS

BACKGROUND OF THE INVENTION

1. Field of the Invention (Technical Field)

The present invention relates to an apparatus and method for passively compensating for thermal expansion, and particularly to an apparatus for regulating the distance separating two objects using regulating components fashioned from materials having a non-constant coefficient of thermal expansion.

2. Background Art

Changes in ambient temperature cause objects to undergo physical changes, especially in size. Changes in the size of an object due to temperature changes is a function of the coefficient of thermal expansion (CTE) of the material of which the object is composed. In some engineering and scientific operations, changes in size of an object can be deleterious. For example, an ambient temperature change may alter the size of one or more key components of a device, thus impairing the function or accuracy of the device, especially if the device is a finely tuned or calibrated machine. For instance, it is well known that the imaging performance of an optical system is dependent on temperature. Increases and decreases in ambient temperature change the physical dimensions of both the lens elements as well as the mechanical components of an optical system. Also, the refractive properties of the lens elements change with changes in ambient temperature.

It is seen, therefore, that there is a need for a method and apparatus for adjusting or controlling the spacing between two objects, such as components in a device, to compensate for changes in component dimensions due to shifts in ambient temperature. Such an apparatus or method ideally is passive, that is, the compensation occurs "automatically" as a consequence of the temperature change, as opposed to requiring active monitoring and intervention of the machine operator.

One method and apparatus for passively compensating for thermal expansion or contraction, to control component spacing, is disclosed in U.S. Pat. No. 5,557,474 to McCrary, the entire disclosure of which is incorporated herein by reference. The McCrary device uses a plurality of annular spacers with conical seats. The spacers are arranged in pairs, with spacers in a pair having different CTEs, and all the spacers ordinarily having a different CTE from the segments of the regulated device (e.g., a lens barrel). As the ambient temperature rises, all of the spacers, as well as all of the mechanical elements of the system, expand. However, one spacer in each pair expands considerably faster then the other. The spacers being annular cones, the first spacer moves outward relative to the central axis of the optical system faster than the other spacer. Thus, unwanted positional shifts between to objects, such as lenses, are compensated during the thermal change. Materials with differing CTEs and angled interfaces transform a transverse or radial dimensional change into a longitudinal dimensional change to control relative movement as a function of temperature, thereby maintaining, for example, the focus of a compound lens system.

The McCrary device may be adequate to its purpose when the device is not exposed to an extremely wide range of temperatures, and for spacer components fashioned from a material with a relatively non-constant CTE over the temperature range encountered. The McCrary device is inadequate when the ambient temperature may range widely, and especially when the spacer components are made from materials having a non-constant CTE. It is known that many materials otherwise acceptable for spacer construction have a non-linear CTE at the extremes of a given temperature range. Additionally, in many applications, it is desirable to use compensating spacer elements that are manufactured from a material, such as a polymer, having a certain critical performance characteristic (coefficient of friction, shear modulus, modulus of elasticity, hardness, or the like), and yet also having a non-linear CTE in the anticipated ambient temperature range.

It is known, therefore, to provide a collection of compensating components made from materials having constant CTEs over the encountered temperature range to provide "automatic" adjustment for thermal changes. However, in some optical systems, it may be necessary to employ a compensating element manufactured from a material having a very high CTE in order to provide adequate compensation over the expected temperature range. Materials having high CTEs commonly also have non-linear CTEs, that is, the CTE itself changes as a function of temperature. A material with a sufficiently high CTE (or perhaps some other characteristic) to meet application requisites may have a CTE sufficiently non-linear as to be unusable in known compensation systems.

A continuing need remains, therefore, for an apparatus and method for providing passive compensation for thermal expansion or contraction in a device, that provides compensation over an appreciable temperature range and especially incorporating elements composed of materials having non-constant coefficients of thermal expansion. Some optical systems preferably or necessarily incorporate plastic components having non-linear coefficients of thermal expansion, i.e., the coefficient itself changes significantly as the ambient temperature changes. With such non-linear dimensional changes, the compensations provided by a "linear" device such as McCrary's are insufficient.

SUMMARY OF THE INVENTION
(DISCLOSURE OF THE INVENTION)

An apparatus for passively compensating for undesirable positional shifts in objects due to temperature changes. The apparatus is particularly suited for use in optical assemblies, where it is desired to compensate for thermal changes in the system to maintain an optical focus despite large changes in environmental temperature. A specially configured compensating member is placed between two objects whose spacing is to be regulated. The compensating member is composed of a material having a non-linear coefficient of thermal expansion, to permit the use of a compensating member also having a very high average coefficient of thermal expansion. The compensating member has multiple ramps or faces positioned at differing angles to permit thermal compensation to be predetermined and provided for selected temperatures, despite the non-linearity of the compensating member's coefficient of thermal expansion.

There is provided according to the invention an apparatus for compensating for thermal expansion or contraction of two objects, the apparatus comprising: a member having a nonlinear coefficient of thermal expansion, the member comprising: a first face disposed at a first angle in relation to the axis and defining a first oblique seat, the magnitude of the first angle corresponding to the member's coefficient of thermal expansion at a first average temperature; and a second face adjacent to the first face, the second face disposed at a second angle in relation to the axis and defining a second seat, the second angle corresponding to the member's coefficient of thermal expansion at a second average temperature. The member and the first and second seats preferably are substantially annular. The recited first angle is greater than the second angle, and the first face defines an inner ring seat, the second face defines an outer ring seat, wherein the outer ring seat is radially outward from the axis in relation to the inner ring seat. The apparatus preferably further comprises a second inner ring seat and a second outer ring seat on an opposite side of the member from the inner ring seat and the outer ring seat.

The invention may comprise a thermally compensative optical system comprising: a forward lens barrel and a second lens barrel arranged along an axis, the barrels movable axially in relation to each other; a member disposed between and contactable with the forward and second lens barrels, the member having a non-linear coefficient of thermal expansion, and the member comprising: a first face disposed at. a first angle in relation to the axis and defining a first seat; and a second face adjacent to the first face, the second face disposed at a second angle in relation to the axis and defining a second seat. The first seat preferably comprises a first inner oblique seat and the second seat comprises a first outer oblique seat, wherein the outer oblique seat is radially outward from the axis in relation to the inner oblique seat. This embodiment preferably further comprises a second inner oblique seat and a second outer oblique seat on an opposite side of the member from the first inner oblique seat and the outer oblique seat. Preferably, the second inner oblique seat comprises a face disposed at a third angle in relation to the axis, and the second outer oblique seat comprises a face disposed at a fourth angle in relation to the axis. Also the third angle preferably is approximately equal to the first angle, and the fourth angle is approximately equal to the second angle, and the member and all the seats are substantially annular.

In this same embodiment of the invention, the first angle preferably is greater than the second angle, and the first face defines an inner ring seat, the second face defines an outer ring seat, wherein the outer ring seat is radially outward from the axis in relation to the inner ring seat. The system preferably further comprises: a forward inner compensation seat on the forward lens barrel; a forward outer compensation seat on the forward lens barrel; a rear inner compensation seat on the second lens barrel; and a rear outer compensation seat on the second lens barrel, wherein the forward inner compensation seat is contactable with the first inner oblique seat of the member, and the forward outer compensation seat is contactable with the first outer oblique seat of the member, and the rear inner compensation seat is contactable with the second inner oblique seat of the member, and the rear outer compensation seat is contactable with the second outer oblique seat of the member.

A primary object of the present invention is to provide a method and apparatus for compensating for thermal expansion and contraction in an assembly, using compensating elements having a non-linear coefficient of thermal expansion.

A primary advantage of the present invention is that passive, selective, thermal compensation is provided in a system or assembly exposed to a wide range of temperature changes, despite the desirability to employ compensating elements having a non-linear coefficient of thermal expansion.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention relates to a method an apparatus for passively compensating for thermal expansion of component parts in a device. It may find beneficial application in a wide variety of fields, for example optics. The invention is particularly suited for use in environments where temperature conditions or ranges mandate the use of materials having non-constant coefficients of thermal expansion (CTE). Thus the invention permits the use of compensating materials with greatly non-linear CTEs. For example certain plastics, which for their other physical performance reasons are needed in some optical systems, may have a non-linear CTE.

While designing an optical system, it became clear that a material with a very high CTE would be required to thermally compensate. Unfortunately, the materials with a suitably high CTE also had a CTE that was sufficiently non-linear to be otherwise unusable. The present invention permits athermal materials with greatly non-linear CTEs to be employed.

By way of example, in an optical system it may be necessary to provide some means of compensating for thermal contraction or expansion of components of the system, in order to maintain an optical focus. However, optical system specifications and/or anticipated operating conditions may require the use of a compensator element made from a material with a high CTE in order adequately to thermally compensate—precluding the use of compensation elements fashioned from materials having a constant CTE. The present invention permits the use of an athermal compensator with a non-linear CTE. By using a compensator element, e.g. a ring, having multiple seats arranged at different angles, one can tailor the compensation provided by the element to accurately track or correspond to wide ranges in temperature, despite non-linearities in the element's CTE.

Figure 1:
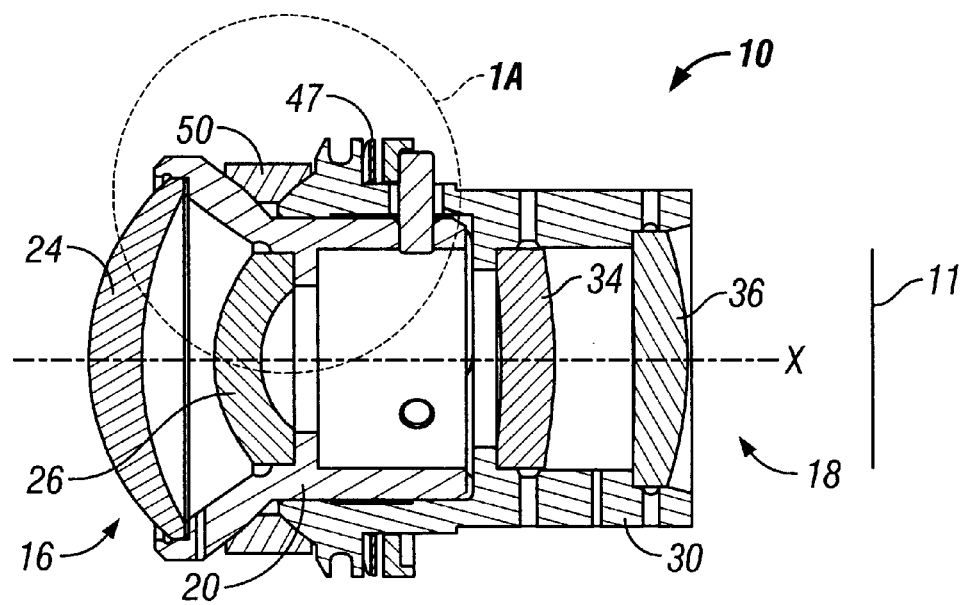
FIG. 1 is a side (axial) sectional view of an optical assembly incorporating one embodiment of the present invention.

FIG. 1 depicts an example of the invention in application within a wide field of view optical assembly 10. The assembly 10 includes a first lens group 16 and a second lens group 18. The first lens group 16 features one or more lenses—two lenses, 24 and 26, shown by example in FIG. 1—mounted in a generally cylindrical forward lens barrel 20 in any suitable manner. One or more additional secondary lenses 34, 36 are mounted within a second or rear lens barrel 30 to comprise the second lens group 18. Lenses 24, 26, and 34, 36 are disposed coaxially along the optical axis X. The barrels 20 and 30 are constrained to move relative to each other along the axis X so as to be adjustable in position to focus an optical image upon the image plane 11, as generally known in the art. In FIG. 1, for example, the forward barrel 20 is slidably received into a cylindrical bore of the second barrel 30 to be capable of controlled telescoping-type movement axially with respect to the second barrel. A biasing means, such as one or more springs 47 (FIG. 1) are disposed in a known manner constantly to bias the two barrels 20, 30 axially toward each other.

Thus, the two-part assembly 10 consists of the first "male" barrel 20 through which a bore is formed for holding the lenses 24, 26. The second or second "female" barrel 30 (which also mounts the second lenses 34, 36) is secured over the first barrel to maintain the biasing means, such as a load spring or elastic member, against the first barrel to assure that the barrels are not free to move or vibrate while maintaining the abutting relationship of the elements.

At room temperature, the optical assembly 10 is adjusted so that the view image is focused at the image plane 11. Absent any compensation therefore, any subsequent temperature change thermally affects the optical materials and mechanical components of the system, causing the image to become defocused. For example, it may be that for the system shown, in order to adjust for defocus due to thermal changes, the distance between the first lens group 16 and a second lens group 18 must be varied; perhaps at a determined rate of, say, minus 0,01 inch per change of 30° C. along the optical axis X. Such an amount of positional shift can accommodate various thermal effects, including changes in the index of refraction, the lens shapes and the relative dimensions of the lenses and mechanical system components.

The distance change requirement is precisely accomplished by the present invention by providing a specially customized compensation ring 50 disposed generally coaxially with and between the barrels 20, 30. The compensation ring 50 is specially shaped to feature two or more contact slopes or seats 51, 53 (FIGS. 1A and 5) as further disclosed herein. By providing a selected contact slope angle of each seat 51 or 53, the invention makes possible the use of a compensation ring 50 made of a material manifesting desirable performance characteristics but a non-linear CTE.

Figure 1A:
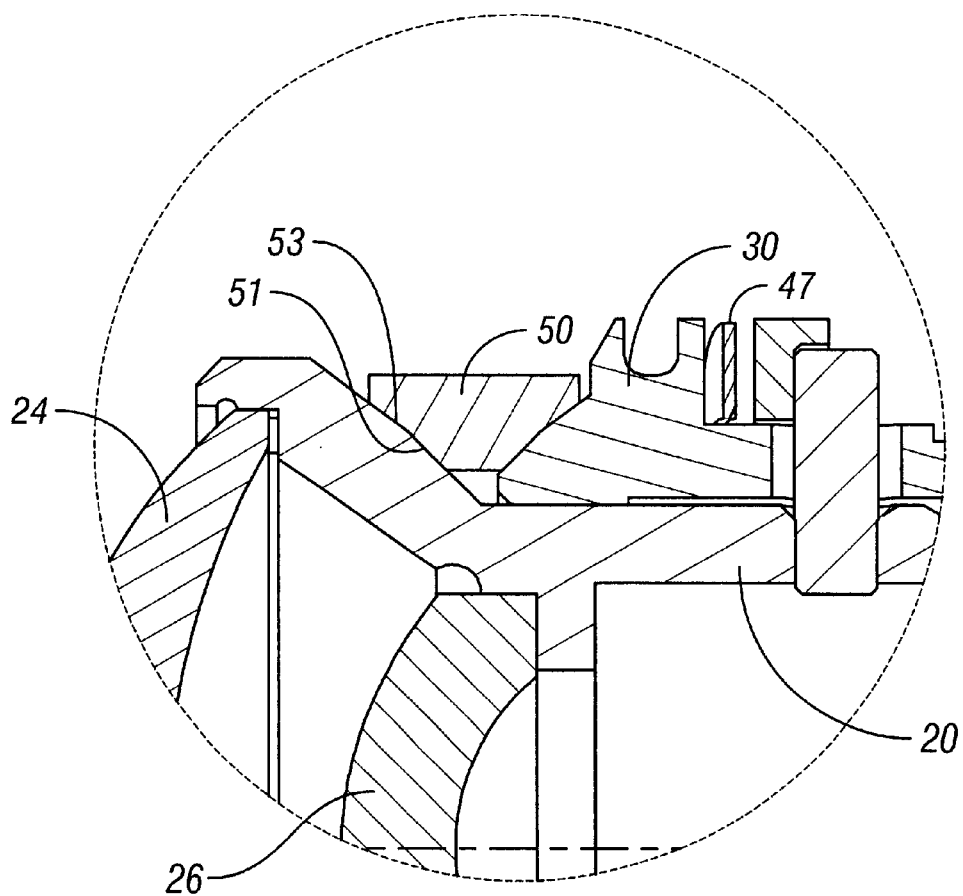
FIG. 1A is an enlarged side (axial) sectional view of a portion of the embodiment shown in FIG. 1, showing certain elements of the apparatus of the invention.
Figure 2:
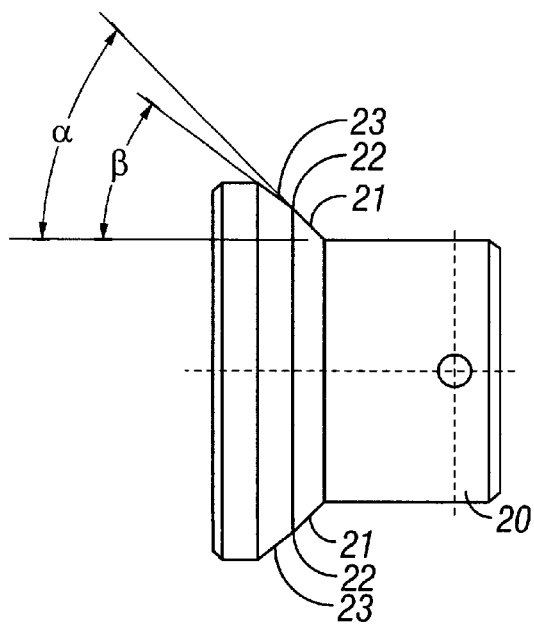
FIG. 2 is a side view of the forward lens barrel portion of the embodiment shown in FIG. 1.
Figure 3:
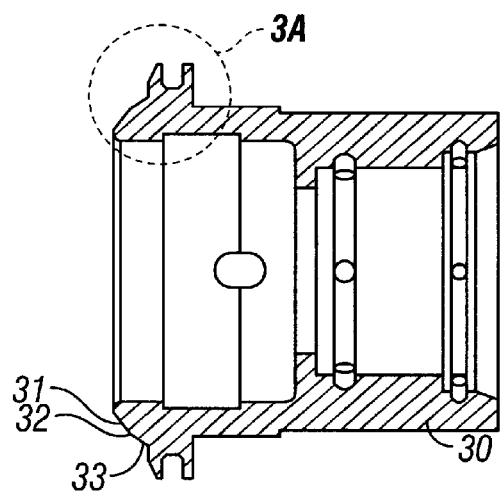
FIG. 3 is a side (axial) sectional view of a second, or rear, lens barrel portion of the embodiment shown in FIG. 1.
Figure 3A:
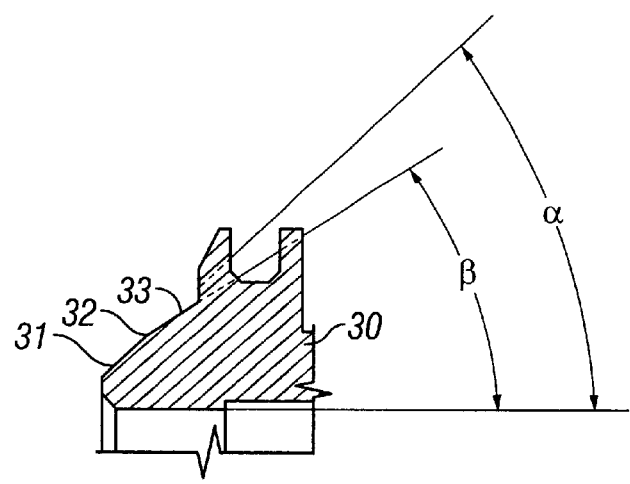
FIG. 3A is an enlarged side (axial) sectional view of a portion of the embodiment shown n FIG. 3, showing certain elements of the apparatus of the invention.

Combined reference is made to FIGS. 1–3A. In the practice of the invention, the first lens group 16 is selectively moved, via movement of the forward barrel 20, during a thermal change to assure that the focus of the entire optical assembly 10 coincides with the desired image plane 11. In this embodiment, the barrel 20 mounting the first lens group 16 carries two angled surfaces defining forward compensation seats 21, 23 (FIGS. 1A and 2) at an interface between the forward barrel 20 and the annular compensation ring 50. The compensation ring 50 also abuts to angled surfaces on the second lens barrel 30 defining rear compensation seats 31, 33 (FIGS. 1A, 3 and 3A). The first lens group 16 is thereby controllably displaceable relative to the second lens group 18, as described below.

Referring to FIG. 2, it is seen that the forward lens barrel 20 mounts or defines forward compensation seats 21, 23. The seats 21, 23 preferably are defined by an integral portion of the barrel 20, or alternatively may be defined by separate element mounted upon the barrel. Each of seats 21, 23 is generally annular in configuration, and has a conical face that is obliquely angled in relation to the optical axis X. An inner forward compensation seat 21 defines an angle α with the optical axis X, while an outer forward compensation seat 23 defines an angle β therewith. A circular edge or margin 22 defines the transition between the faces of the two seats 21, 23. The acute angle β between the outer seat 23 and the optical axis X is less than the acute angle α between the inner seat 21 and the optical axis. The respective sizes of angles α and β are selected according to the CTE of the material of the compensation ring 50, and the rate at which the relative positions of the barrels 20, 30 must be compensated. In one embodiment of the invention, for example, angle β is about 36.7°, and angle α is about 45°.

Similarly, FIGS. 3 and 3A show that the rear or second lens barrel 30 has rear compensation seats 31, 33. The seats 31, 33 preferably are defined by an integral portion of the barrel 30, or alternatively may be defined by a separate element mounted upon the second barrel. Each of seats 31, 33 is generally annular in configuration, and has a flat face that is obliquely angled relative to the optical axis X. As best seen in FIG. 3A, an inner rear compensation seat 31 defines angle α with the optical axis X, while an outer rear compensation seat 33 defines angle β therewith. The circular margin 32 defines the transition between the two seats 31, 33. The acute angle β between the outer rear seat 33 and the optical axis X ordinarily and preferably is about equal to angle β between the outer forward seat 23 and the optical axis X. Likewise, the acute angle α between the inner rear seat 33 and axis X ordinarily and preferably is about equal to angle α between the inner forward seat 23 and axis X. As seen in FIGS. 1 and IA, the forward seats 21, 23 face toward the rear (to left in FIG. 1) of assembly 10, while the rear seats 31, 33 face toward the front.

Figure 4B:
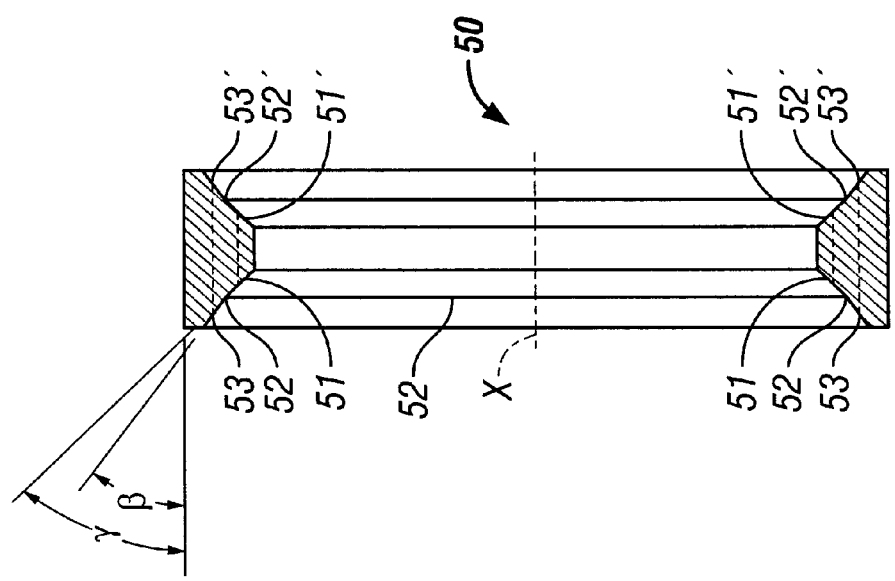
FIG. 4B is an enlarged side (axial) sectional view of the compensating ring element shown in FIG. 4A, taken along section line 4B—4B in FIG. 4A.
Figure 4A:
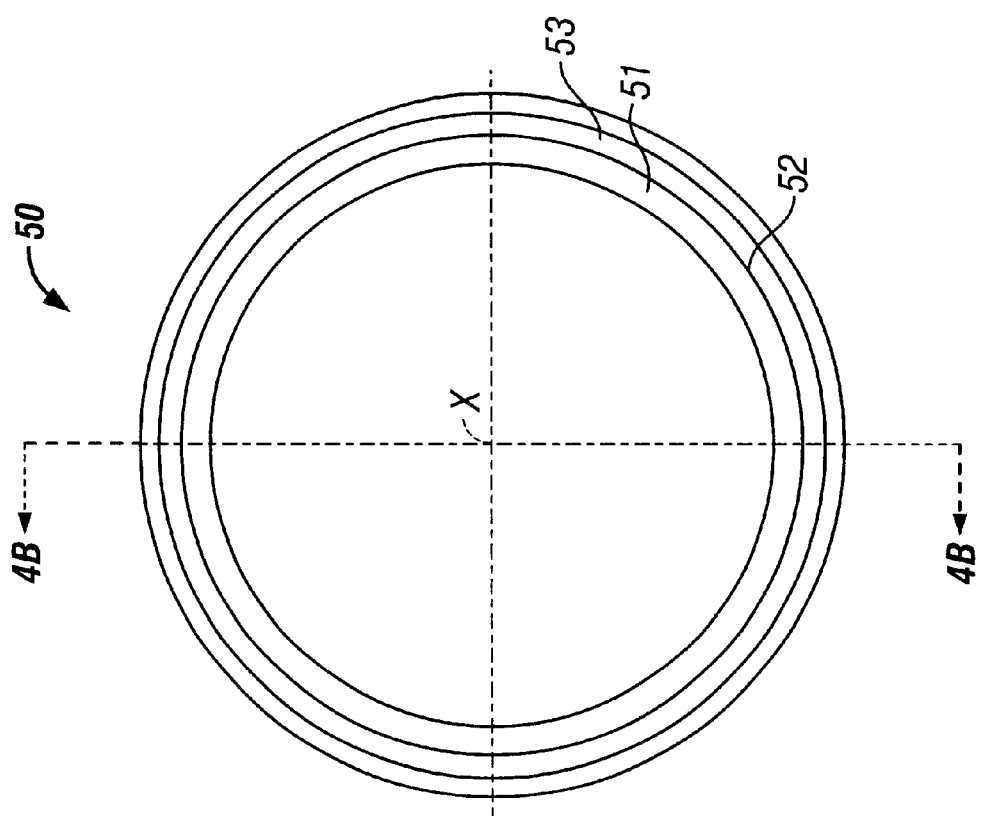
FIG. 4A is an enlarged end (radial) view of the compensating ring element of the apparatus according to the present invention.
Figure 5A:
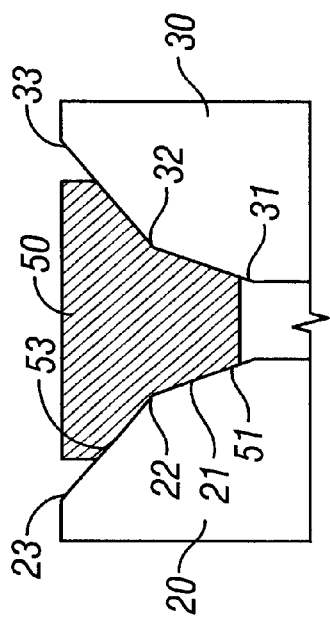
FIGS. 5A–5C are enlarged (and exaggerated for illustrative clarity) axial sectional views of certain functional elements of the apparatus according to the present invention, shown in different stages of operation.
Figure 5C:
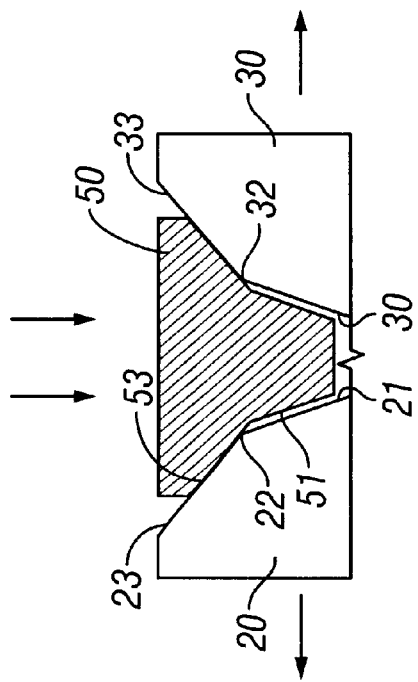
Figure 5:
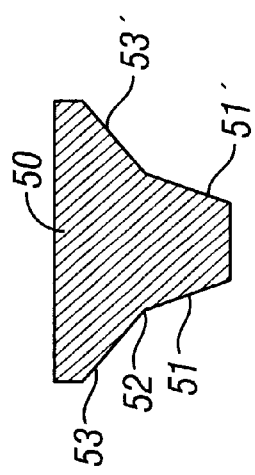
FIG. 5 is an enlarged and exaggerated axial sectional view of a portion of the compensating ring element seen in FIG. 4A.

FIGS. 1, 4A, 4B and 5 provide detailed illustration of the compensation ring 50. Compensation ring 50 is annular with a polygonal, bilaterally symmetrical axial cross section, as seen in FIGS. 4B and 5. The two radial or end faces of the compensation ring 50 feature two oblique or angled surfaces defining inner ring seats 51, 51' and outer ring seats 53, 53'. The compensation ring seats 51, 51' and 53, 53' are configured to be complementary to the forward compensating seats 21, 23 of the forward lens barrel 20 and rear compensating seats 31, 33 of the second lens barrel 30, respectively, as seen in FIGS. 1A and 5–5C. Each of the ring seats 51, 51', 53, 53' is generally annular in configuration, and has a smooth face that is obliquely angled in relation to the optical axis X. One pair of ring seats 51, 53 face oppositely, in axial relation, from the other pair of seats 51', 53'.

Inner ring seats 51, 51' define an angle γ with the optical axis X, while outer ring seats 53, 53' define an angle δ with the axis. A circular edge or margin 52 defines the transition between the faces of the two ring seats 51, 53. The angle γ between the inner ring seat 51 and the optical axis X preferably corresponds generally to angle α between the optical axis X and the inner compensation seats 21, 31 on the barrels 20, 30. For example, angle γ is about 45° in one embodiment of the invention. Similarly, the angle δ between the outer ring seat 53 and the axis X preferably corresponds generally to angle β between the axis X and the outer seats 23, 33 on the barrels 20, 30. For example, angle δ is about 36.70 in one embodiment of the invention.

Very advantageously, the compensation ring 50 may be composed of material having one or more desirable qualities, or physical properties, suited for the particular application at hand. For example, it may be necessary to manufacture the compensation ring 50 from a plastic having a non-linear coefficients of thermal expansion, such as ultra high molecular weight polyethylene (UHMW-PE). Use of UHMW-PE, or similar plastics or polymers, may be needed in order to have a compensation ring 50 of high enough CTE to provide adequate compensation.

The magnitudes of the angles defining the ring seats 51, 51', 53, 53' and the compensation seats 21, 31, 23, 33 are determined to suit the given application, with the composition of the compensation ring (and its non-linear CTE profile) and the expected temperature ranges being two of the relevant variables. Once the design parameters are established, it is known how to calculate the size of the angles (e.g. angles γ and δ) according to known principles, reference being made to U.S. Pat. No. 5,557,474 for additional information in this regard. Some averaging is necessary, since the CTE of the ring material will vary during changes in temperature (i.e. the CTE of the material at a given instant depends upon the temperature at that instant). The angled configuration of the inner ring seat 51 will be determined for an "average" CTE of the ring material over a first range of (higher) temperatures to be encountered, while the configuration of the outer ring seat 53 will be based upon a different average CTE for a second (lower) range of temperatures. It is noted in this regard that the compensation ring 50 (and associated lens barrels 20, 30) could have more than two angled seats. A highly incremental compensation ring according to the present invention potentially could employ a plurality of ring seats, such as three or four, each one angled on account of an "average" CTE of the ring material over relatively narrower temperature ranges. Theoretically, as the number of angled seats increase towards infinity, a curved seat would result. However, as this becomes the case, the contact area approaches a line contact. This line contact would present a problem of drastic local plastic deformation for soft materials such as most plastics. This local deformation would likely inhibit the free relative sliding motion of the ring relative to its seats.

Figure 5B:
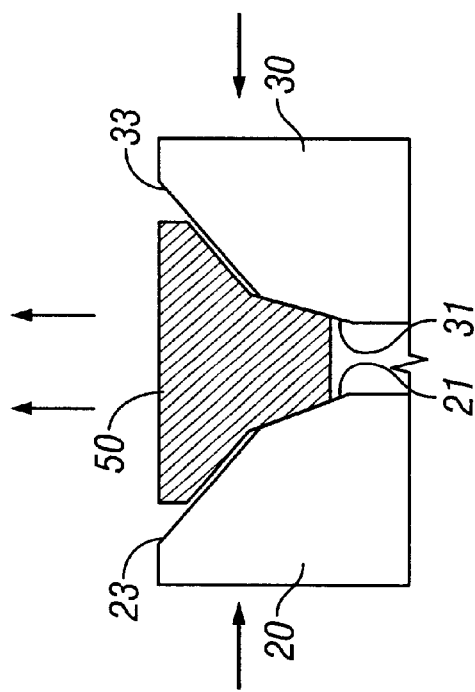

Further understanding is had by reference to FIGS. 5A–5C. FIG. 5A is an enlarged view of the compensation ring 50 as situated at ambient temperature on the assembly 10 between the functionally interfacing portions of the forward lens barrel 20 and the second lens barrel 30. It is noted that the forward compensating seats 21, 23 are in confronting relation to the rear compensation seats 31, 33. The seats 21, 23, 31, 33 and the compensation ring 50 being annular, it is understood that the arrangement shown in enlarged detail in FIG. 5A obtains for the complete circumference of the optical assembly 10. A properly configured ring 50 at ordinary ambient temperature is seen to have its respective inner ring seats 51, 51' in contact with the forward inner compensation seat 21 and with the rear inner compensation seat 31 (FIG. 5A). This contact preferably, but not critically, is a substantially flush contact at ambient temperature. Similarly, as also seen in FIG. 5A, the outer ring seats 53, 53' on the ring 50 are in contact with the forward outer compensation seat 23 and the rear outer compensation seat 33, respectively.

FIGS. 5B and 5C illustrate a function of the invention during temperature changes. When the ambient temperature rises, the lens barrels 20, 30 of the optical assembly expand, and their respective inner ends shift axially inwardly as indicated by the directional arrows of FIG. 5B. The compensation ring 50 also tends to expand radially. (The angles of the seats are selected and fashioned to compensate for thermal growth of all parts, including the axial growth of the ring 50 itself.) The resulting compression upon the interposed compensation ring 50, and the oblique interfaces between the ring seats 51, 51', 53, 53' and the compensating seats 21, 31, 23, 33 push the ring radially outward, as also indicated by a directional arrow in FIG. 5B. As a result, at elevated temperatures, only the ring's inner ring seats 51, 51' are in contact with the lens barrels 20, 30 where the inner ring seats ride against the forward and rear inner compensation seats 21, 31. The outer ring seats 53, 53' move out of contact with the outer compensation seats 23, 33. At elevated temperatures, then, the interposition of the ring 50 between only the inner compensation seats 21, 31 regulates the extent and rate at which the lens barrels can move closer together due to rising temperature. The compensation rate provided by the ring 50 under such condition is a function of, among other things, the magnitude of angle α (defining the inner compensation seats 21, 31) and of angle γ (defining the inner ring seats 51, 51'), which angles may be equal. The size of angles β and δ is not germane at elevated temperatures, since the ring 50 is then out of contact with the outer compensation seats 23, 33 as seen in FIG. 5B.

A converse situation is realized when the temperate decreases below the ambient condition. FIG. 5C shows that as the temperature drops, the lens barrels 20, 30 of the optical assembly contract, and their respective inner ends shift axially outwardly as indicated by the directional arrows of FIG. 5C. The compensation ring 50 also tends to contract radially. The compensation ring 50 is relatively free to shift radially inward as indicated by a directional arrow in FIG. 5C. Consequently, at reduced temperatures, only the ring's outer ring seats 53, 53' are in contact with the lens barrels 20, 30, where the outer ring seats ride against the forward and rear outer compensation seats 23, 33. The inner ring seats 51, 51' move out of contact with the inner compensation seats 21, 31. The interposition of the ring 50 between only the outer compensation seats 23, 33 regulates the extent and rate at which the lens barrels can move further apart due to decreasing temperature—it being recalled that the barrels 20 and 30 are spring-biased toward each other. The compensation rate provided by the ring 50 under such condition is a function of, among other things, the magnitude of angle β (defining the seats 23, 33) and of angle δ (defining the outer ring seats 53, 53'), which may be equal. The size of angles α and γ is not germane at reduced temperatures, since the ring 50 is then out of contact with the inner compensation seats 21, 31 as seen in FIG. 5C.

The different angles of the ring seats 51, 53 on the compensating ring 50 permit the compensation function of the invention to account for the non-linear CTE of the ring material. When a negative spacing change (wherein the spaced apart objects (e.g. barrels 20, 30) get loser as temperature increases) is desired, the ring 50 typically will have a larger CTE value. he increase in CTE is a function of the increase in temperature. However, at the higher CTE, he relatively larger magnitude of the angle γ regulates the spacing change, since the inner ring seat 21 is the only ring seat in contact with the spaced apart objects (FIG. 5B). In a complementary manner, when a positive spacing change (wherein the spaced apart objects move apart as the temperature decreases) is desired, the ring 50 typically will have a smaller CTE value. The decrease in CTE is, again, a function of the change in temperature. However, at the lower CTE, the relatively smaller magnitude of the angle δ regulates the spacing change, since the outer ring seat 23 is the only ring seat in contact with the spaced apart objects (FIG. 5C). The sizes of the angles γ and δ are tailored to accommodate the average CTEs manifested by the ring 50 over the increased and decreased temperature ranges (above ambient), respectively, expected to be encountered. Alternatively, the angles of the ring seats 51, 53 may be precalculated and configured to accommodate the CTEs manifested near the anticipated temperature extremes, rather than averages. The algorithm for determining the CTE, at a given temperature, for a particular material is usually known for most common useful materials.

As the temperature rises, the ring 50, as well as all of the mechanical elements of the system, expand. However, the compensating ring expands considerably faster than the barrels 20, 30. Being annular, the ring 50 moves outward relative to the central axis X of the optical system faster than the barrels and their compensation seats 21, 31. This permits the space between the lens barrels 20, 30 to be reduced by biasing the barrels together. As mentioned, to assure that the compensating seats 21, 31 or 23, 33 and the ring 50 are abutting at all times, a biasing means, such as a load spring, elastic material or other form of passive biasing is used.

If a positive controlled dimensional change is desired, i.e., the lens barrels 20, 30 move apart with decreased temperature, the angle δ defining the outer ring seats 51, 51' is selected to accommodate the lower coefficient of thermal expansion.

The relative angles γ, δ can be utilized to control the degree of change in the spacing between the two objects or barrels 20, 30. The smaller the angle between the radial plane normal to the axis X) and the ring seat 51 or 53, the smaller the degree of change in the pacing. The larger the angle γ or δ, of course, the greater the change in the spacing between the two barrels 20, 30 or other objects. It is known that too steep an angle γ or δ of the ring seats 51, 53 (or corresponding angles defining the compensation seats on the barrels) might result in the interfaced seats locking together due to their relative coefficients of friction or Brinelling. To avoid the necessity of using too steep an angle, it may be possible to increase the contact radius, or to choose alternative materials having suitable coefficients of thermal expansion.

By selecting different contact angles y and δ contact radii, and materials having a known non-linear CTE "profile" for a given thermal range, a predetermined space change can be achieved, and the relative positions of the entire lens groups 16, 18 are controlled during a temperature change. Of course, is possible to use the present invention to shift one lens group (e.g. first lens group 16) and nest another thermal compensation device in accordance with the present invention within that lens group to selectively control the spacing of various lenses (e.g. 24, 26) within the lens group 16.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosure of all references, applications, patents, and publications cited above are hereby incorporated by reference.

What is claimed is:

1. An apparatus for compensating for thermal expansion or contraction of two objects, said apparatus comprising:
   a member having a non-linear coefficient of thermal expansion, said member comprising:
      a first face disposed at a first angle in relation to said axis and defining a first oblique seat, the magnitude of said first angle corresponding to said member's coefficient of thermal expansion at a first average temperature; and
      a second face adjacent to said first face, said second face disposed at a second angle in relation to said axis and defining a second seat, said second angle corresponding to said member's coefficient of thermal expansion at a second average temperature.

2. An apparatus according to claim 1 wherein said member and said first and second seats are substantially annular.

3. An apparatus according to claim 2 wherein said first angle is greater than said second angle, and said first face defines an inner ring seat, said second face defines an outer ring seat, wherein said outer ring seat is radially outward from said axis in relation to said inner ring seat.

4. An apparatus according to claim 2 further comprising a second inner ring seat and a second outer ring seat on an opposite side of said member from said inner ring seat and said outer ring seat.

5. A thermally compensative optical system comprising:
   a forward lens barrel and a second lens barrel arranged along an axis, said barrels movable axially in relation to each other;
   a member disposed between and contactable with said forward and second lens barrels, said member having a non-linear coefficient of thermal expansion, and said member comprising:
      a first face disposed at a first angle in relation to said axis and defining a first seat; and
      a second face adjacent to said first face, said second face disposed at a second angle in relation to said axis and defining a second seat.

6. A system according to claim 5 wherein said first seat comprises a first inner oblique seat and said second seat comprises a first outer oblique seat, wherein said outer oblique seat is radially outward from said axis in relation to said inner oblique seat.

7. A system according to claim 6 further comprising a second inner oblique seat and a second outer oblique seat on an opposite side of said member from said first inner oblique seat and said outer oblique seat.

8. A system according to claim 7 wherein said second inner oblique seat comprises a face disposed at a third angle in relation to said axis, and said second outer oblique seat comprises a face disposed at a fourth angle in relation to said axis.

9. A system according to claim 8 wherein said third angle is approximately equal to said first angle, and said fourth angle is approximately equal to said second angle.

10. A system according to claim 6 wherein said member and all said seats are substantially annular.

11. A system according to claim 10 wherein said first angle is greater than said second angle, and said first face defines an inner ring seat, said second face defines an outer ring seat, wherein said outer ring seat is radially outward from said axis in relation to said inner ring seat.

12. A system according to claim 7 further comprising:
a forward inner compensation seat on said forward lens barrel;
a forward outer compensation seat on said forward lens barrel;
a rear inner compensation seat on said second lens barrel; and
a rear outer compensation seat on said second lens barrel;
wherein said forward inner compensation seat is contactable with said first inner oblique seat of said member, and said forward outer compensation seat is contactable with said first outer oblique seat of said member, and said rear inner compensation seat is contactable with said second inner oblique seat of said member, and said rear outer compensation seat is contactable with said second outer oblique seat of said member.

13. A system according to claim 12 wherein said first angle has a magnitude corresponding to said member's coefficient of thermal expansion at a first average temperature, and said second angle has a magnitude corresponding to said member's coefficient of thermal expansion at a second average temperature.

14. A system according to claim 13, wherein at said first average temperature, said forward inner compensation seat is in sliding contact with said first inner oblique seat of said member and said rear inner compensation seat is in sliding contact with said second inner oblique seat of said member, while said forward outer compensation seat is spaced apart from said first outer oblique seat of said member and said rear outer compensation seat is spaced apart from said second outer oblique seat of said member.

15. A system according to claim 13, wherein at said second average temperature, said forward inner compensation seat is spaced apart from said first inner oblique seat of said member and said rear inner compensation seat is spaced apart from said second inner oblique seat of said member, while said forward outer compensation seat is in sliding contact with said first outer oblique seat of said member and said rear outer compensation seat is in sliding contact with said second outer oblique seat of said member.

* * * * *